(12) United States Patent
He

(10) Patent No.: US 11,353,748 B2
(45) Date of Patent: Jun. 7, 2022

(54) LIQUID CRYSTAL DISPLAY DEVICE

(71) Applicant: HKC Corporation Limited, Shenzhen (CN)

(72) Inventor: Huailiang He, Shenzhen (CN)

(73) Assignee: HKC Corporation Limited, Shenzhen (CN)

( * ) Notice: Subject to any disclaimer, the term of this patent is extended or adjusted under 35 U.S.C. 154(b) by 43 days.

(21) Appl. No.: 16/643,822

(22) PCT Filed: Nov. 15, 2017

(86) PCT No.: PCT/CN2017/111188
§ 371 (c)(1),
(2) Date: Mar. 2, 2020

(87) PCT Pub. No.: WO2019/041575
PCT Pub. Date: Mar. 7, 2019

(65) Prior Publication Data
US 2020/0348568 A1    Nov. 5, 2020

(30) Foreign Application Priority Data

Aug. 30, 2017   (CN) .......................... 201710762438.7

(51) Int. Cl.
*G02F 1/13357*     (2006.01)
*G02F 1/1333*      (2006.01)

(52) U.S. Cl.
CPC .. *G02F 1/133615* (2013.01); *G02F 1/133602* (2013.01); *G02F 1/133308* (2013.01); *G02F 1/133317* (2021.01)

(58) Field of Classification Search
None
See application file for complete search history.

(56) References Cited

U.S. PATENT DOCUMENTS

| 4,789,224 A | * | 12/1988 | Bougsty | G02B 6/0046 |
| | | | | 349/149 |
| 6,406,160 B1 | * | 6/2002 | Itoh | G02B 6/0018 |
| | | | | 349/65 |
| 6,417,897 B1 | * | 7/2002 | Hashimoto | G02F 1/133615 |
| | | | | 349/150 |

(Continued)

FOREIGN PATENT DOCUMENTS

| CN | 102434824 A | 5/2012 |
| CN | 207352319 U | 5/2018 |
| JP | 2008-47291 A | 2/2008 |

*Primary Examiner* — Shan Liu
(74) *Attorney, Agent, or Firm* — Wang Law Firm, Inc.

(57) ABSTRACT

A liquid crystal display device comprises: a light guide panel for backlight, the light guide panel having a front surface, a rear surface, and four side surfaces, wherein the four side surfaces are positioned between the front surface and the rear surface, the four side surfaces include a wide side surface, a narrow side surface, a first side surface and a second side surface, the first side surface and the second side surface are positioned between the wide side surface and the narrow side surface, the front surface consists of a flat section and a slanted section, and the slanted section is positioned at an edge of the light guide panel and adjacent to the narrow side surface; at least one backlight source provided at least one of the side surfaces; and a circuit board provided at the slanted section of the light guide panel.

7 Claims, 12 Drawing Sheets

(56) References Cited

U.S. PATENT DOCUMENTS

| | | | |
|---|---|---|---|
| 2002/0180908 A1* | 12/2002 | Ariyoshi | G02F 1/133615 |
| | | | 349/113 |
| 2004/0189891 A1* | 9/2004 | Hayashimoto | G02F 1/133615 |
| | | | 349/58 |
| 2004/0264162 A1* | 12/2004 | Kashiwagi | G02B 6/0018 |
| | | | 362/600 |
| 2006/0007704 A1* | 1/2006 | Mori | G02B 6/0013 |
| | | | 362/613 |
| 2007/0147074 A1* | 6/2007 | Sakai | G02B 6/0055 |
| | | | 362/608 |
| 2015/0219826 A1* | 8/2015 | Ting | G02B 6/0038 |
| | | | 362/611 |
| 2018/0031758 A1* | 2/2018 | Mizuno | G02B 6/0076 |
| 2019/0086606 A1* | 3/2019 | Wang | G02F 1/133308 |

* cited by examiner

LIQUID CRYSTAL DISPLAY DEVICE

CROSS-REFERENCE TO RELATED APPLICATION

This application claims the benefit of China Patent Application No. 201710762438.7, filed on Aug. 30, 2017, in the State Intellectual Property Office of the People's Republic of China, the disclosure of which is incorporated herein in its entirety by reference.

BACKGROUND OF THE INVENTION

1. Field of the Invention

The present disclosure relates to a liquid crystal display technology field, and more particularly to a structure of a liquid crystal display device.

2. Description of the Related Art

The existing liquid crystal display device usually includes a LCD panel and a light source module, and the light source module includes a light guide plate and a backlight source. The light source module is mainly configured to provide surface light to the LCD panel for display. In general, according to location of the backlight source in the light source module, the light source modules can be classified into a direct type light source module and an edge-lit type light source module. The backlight source of the direct type light source module is disposed on a rear surface of the light guide plate, and the direct type light source module is usually applied to larger-size LCD panel. The backlight source of the edge-lit light source module is disposed on the side surface of the light guide plate, and the edge-lit light source module is usually applied to the smaller-size LCD panel.

Each of the direct type and edge-lit type light source modules has advantages and drawbacks, and the costs of the direct type and edge-lit type light source modules are different. The ultra-thin liquid crystal display devices become increasingly welcome, so development trends of the direct type and the edge-lit type liquid crystal display devices both are towards ultra-thin sizes.

Technologies of the LCD panel and the light source module are fully developed, but the components (such as various circuit boards) of the liquid crystal display device are not optimized in configuration locations thereof, so there is still much room for improvement in thickness of the liquid crystal display device.

SUMMARY OF THE INVENTION

In order to solve the aforementioned problems, the present disclosure provides a technical solution of setting configuration locations of various circuit boards, so as to decrease the thickness of the liquid crystal display device, and maintain uniformity of the light source.

According to an aspect of the present disclosure, the present disclosure provides a liquid crystal display device including a light guide plate, at least one backlight source and a circuit board. The light guide plate is configured for backlight, and comprises a front face, a rear surface and the four side surfaces, and the four side surfaces are located between the front face and the rear surface, the four side surfaces comprises a wide side surface, a narrow side surface, a first side surface and a second side surface, the first side surface and the second side surface are located between the wide side surface and the narrow side surface. The front face comprises a plane and an inclined surface, the inclined surface is located at an edge of the light guide plate and adjacent to the narrow side surface. The at least one backlight source is disposed on at least one the side surface. The circuit board is disposed on the inclined surface of the light guide plate.

Preferably, the liquid crystal display device further includes a LCD panel disposed on the rear surface of the light guide plate.

Preferably, the liquid crystal display device further includes a tape and reel chip carrier electrically connected to the LCD panel and the circuit board.

Preferably, the liquid crystal display device further includes an integrated circuit disposed on a tape and reel chip carrier, configured to drive the LCD panel.

Preferably, the at least one backlight source disposed on the wide side surface and the first side surface.

Preferably, the liquid crystal display device further includes a light reflective coating layer disposed on the narrow side surface and the second side surface.

Preferably, the liquid crystal display device further includes a variable-frequency circuit board or other circuit board disposed on the inclined surface of the light guide plate, adjacent to the circuit board.

Preferably, the at least one backlight source is disposed on the wide side surface, and the liquid crystal display device further includes a light reflective coating layer disposed on the narrow side surface, the first side surface and the second side surface.

According to other aspect of the present disclosure, the present disclosure provides a liquid crystal display device includes a light guide plate, a backlight source and a circuit board. The light guide plate used for providing backlight and comprises a front face, a rear surface and the four side surfaces. The four side surfaces are located between the front face and the rear surface, the four side surfaces comprises a wide side surface, a narrow side surface, a first side surface and a second side surface, and the first side surface and the second side surface are located between the wide side surface and the narrow side surface. The front face comprises a plane and an inclined surface, the inclined surface is located at an edge of the light guide plate and adjacent to the narrow side surface. The backlight source is disposed on the plane and the inclined surface. The circuit board is disposed on the backlight source located on the inclined surface.

Preferably, the liquid crystal display device further includes a LCD panel disposed on the rear surface of the light guide plate.

Preferably, the liquid crystal display device further includes a tape and reel chip carrier electrically connected to the LCD panel and the circuit board.

Preferably, the liquid crystal display device further includes an integrated circuit disposed on a tape and reel chip carrier, and configured to drive the LCD panel.

Preferably, the backlight source comprises a plurality of the backlight bars.

Preferably, the liquid crystal display device further includes a light reflective coating layer disposed on the four side surfaces.

Preferably, the liquid crystal display device further includes a variable-frequency circuit board or other the circuit board disposed on the inclined surface of the light guide plate, and adjacent to the circuit board.

Preferably, the backlight source is a dot matrix LED.

According to another aspect of the present disclosure, the present disclosure provides a manufacturing method of a liquid crystal display device. The manufacturing method comprise steps: forming a light guide plate for backlight, wherein the light guide plate comprises a front face, a rear surface and the four side surfaces, and the four side surfaces are located between the front face and the rear surface, the four side surfaces comprises a wide side surface, a narrow side surface, a first side surface and a second side surface, the first side surface and the second side surface are located between the wide side surface and the narrow side surface, and the front face comprises a plane and an inclined surface, and the inclined surface is located at an edge of the light guide plate and adjacent to the narrow side surface; forming at least one backlight source on at least one side surface; providing the circuit board disposed on the inclined surface of the light guide plate.

Preferably, the manufacturing method further comprises a step of disposing the LCD panel on the rear surface of the light guide plate.

Preferably, the manufacturing method further comprises a step of providing a tape and reel chip carrier electrically connect to the LCD panel and the circuit board.

Preferably, the manufacturing method further comprises a step of disposing an integrated circuit on the tape and reel chip carrier and configured to drive the LCD panel.

Preferably, the manufacturing method further comprises a step of disposing at least one backlight source on the wide side surface and the first side surface.

Preferably, the manufacturing method further comprises a step of forming a light reflective coating layer on the narrow side surface and the second side surface.

Preferably, the manufacturing method further comprises a step of disposing a variable-frequency circuit board or other circuit board on the inclined surface of the light guide plate, and adjacent to the circuit board.

Preferably, the manufacturing method further comprises a step of forming the at least one the backlight source on the wide side surface, and forming a light reflective coating layer on the narrow side surface, the first side surface and the second side surface.

According to another aspect of the present disclosure, the present disclosure provides a manufacturing method of the liquid crystal display device. The manufacturing method comprises steps: forming a light guide plate which is for backlight and comprises a front face, a rear surface and the four side surfaces, and wherein the four side surfaces are located between the front face and the rear surface, the four side surfaces comprises a wide side surface, a narrow side surface, a first side surface and a second side surface, and the first side surface and the second side surface are located between the wide side surface and the narrow side surface, and the front face comprises a plane and an inclined surface, and the inclined surface is located at an edge of the light guide plate and adjacent to the narrow side surface; providing a backlight source disposed on the plane and the inclined surface; providing a circuit board disposed on the backlight source located on the inclined surface.

Preferably, the manufacturing method comprises step of: providing a LCD panel disposed on the rear surface of the light guide plate.

Preferably, the manufacturing method comprises step of: providing a tape and reel chip carrier electrically connect to the LCD panel and the circuit board.

Preferably, the manufacturing method comprises step of: providing an integrated circuit, disposed on a tape and reel chip carrier, configured to drive the LCD panel.

Preferably, the backlight source comprises a plurality of the backlight bars.

Preferably, the manufacturing method comprises step of: forming a light reflective coating layer on the four side surfaces.

Preferably, the manufacturing method comprises step of: disposing a variable-frequency circuit board or other circuit board on the inclined surface of the light guide plate, and adjacent to the circuit board.

Preferably, the backlight source is a dot matrix LED.

According to another aspect of the present disclosure, the present disclosure provides a liquid crystal display device including a light guide plate, at least one backlight source and a circuit board. The light guide plate used for providing backlight, and comprises a front face, a rear surface and the four side surfaces, and the four side surfaces are located between the front face and the rear surface, the four side surfaces comprises a wide side surface, a narrow side surface, a first side surface and a second side surface, the first side surface and the second side surface are located between the wide side surface and the narrow side surface. The front face comprises a plane, a first inclined surface and a second inclined surface, the first inclined surface is located at a corner of the light guide plate and adjacent to the narrow side surface and the first side surface, and the second inclined surface is located at other corner of the light guide plate and adjacent to the narrow side surface and the second side surface. The at least one backlight source is disposed on at least one of the four side surfaces. The circuit board is disposed on the first inclined surface of the light guide plate.

Preferably, the liquid crystal display device further includes a LCD panel disposed on the rear surface of the light guide plate.

Preferably, the liquid crystal display device further includes a tape and reel chip carrier electrically connected to the LCD panel and the circuit board.

Preferably, the liquid crystal display device further includes an integrated circuit disposed on a tape and reel chip carrier, configured to drive the LCD panel.

Preferably, the at least one backlight source disposed on the wide side surface and the first side surface.

Preferably, the liquid crystal display device further includes a light reflective coating layer disposed on the narrow side surface and the second side surface.

Preferably, the liquid crystal display device further includes a variable-frequency circuit board or other circuit board disposed on the second inclined surface of the light guide plate.

Preferably, the at least one backlight source is disposed on the wide side surface, and the liquid crystal display device further includes a light reflective coating layer disposed on the narrow side surface, the first side surface and the second side surface.

According to other aspect of the present disclosure, the present disclosure provides a liquid crystal display device includes a light guide plate, a backlight source and a circuit board. The light guide plate used for providing backlight and comprises a front face, a rear surface and the four side surfaces. The four side surfaces are located between the front face and the rear surface, the four side surfaces comprises a wide side surface, a narrow side surface, a first side surface and a second side surface, and the first side surface and the second side surface are located between the wide side surface and the narrow side surface. The front face comprises a plane, a first inclined surface and a second inclined surface, the first inclined surface is located at a corner of the light guide plate and adjacent to the narrow side surface and the first side surface, and the second inclined surface is located at other corner of the light guide plate and adjacent to the narrow side surface and the second side surface. The backlight source is disposed on the plane, the first inclined surface and the second inclined surface. The circuit board is disposed on the backlight source located on the first inclined surface.

Preferably, the liquid crystal display device further includes a LCD panel disposed on the rear surface of the light guide plate.

Preferably, the liquid crystal display device further includes a tape and reel chip carrier electrically connected to the LCD panel and the circuit board.

Preferably, the liquid crystal display device further includes an integrated circuit disposed on a tape and reel chip carrier, and configured to drive the LCD panel.

Preferably, the at least one backlight source comprises a plurality of the backlight bars.

Preferably, the liquid crystal display device further includes a light reflective coating layer disposed on the four side surfaces.

Preferably, the liquid crystal display device further includes a variable-frequency circuit board or other the circuit board disposed on the second inclined surface of the light guide plate.

Preferably, the backlight source is a dot matrix LED.

According to another aspect of the present disclosure, the present disclosure provides a manufacturing method of a liquid crystal display device. The manufacturing method comprise steps: forming a light guide plate for backlight, wherein the light guide plate comprises a front face, a rear surface and the four side surfaces, and the four side surfaces are located between the front face and the rear surface, the four side surfaces comprises a wide side surface, a narrow side surface, a first side surface and a second side surface, the first side surface and the second side surface are located between the wide side surface and the narrow side surface, and the front face comprises a plane, a first inclined surface and a second inclined surface, and the first inclined surface is located at a corner of the light guide plate and adjacent to the narrow side surface and the first side surface, and the second inclined surface is located at other corner of the light guide plate and adjacent to the narrow side surface and the second side surface; forming at least one backlight source on at least one side surface; disposing the circuit board on the first inclined surface of the light guide plate.

Preferably, the manufacturing method further comprises a step of disposing the LCD panel on the rear surface of the light guide plate.

Preferably, the manufacturing method further comprises a step of providing a tape and reel chip carrier electrically connect to the LCD panel and the circuit board.

Preferably, the manufacturing method further comprises a step of disposing an integrated circuit on the tape and reel chip carrier and configured to drive the LCD panel.

Preferably, the manufacturing method further comprises a step of disposing at least one backlight source on the wide side surface and the first side surface.

Preferably, the manufacturing method further comprises a step of forming a light reflective coating layer on the narrow side surface and the second side surface.

Preferably, the manufacturing method further comprises a step of disposing a variable-frequency circuit board or other circuit board on the second inclined surface of the light guide plate.

Preferably, the manufacturing method further comprises a step of forming the at least one the backlight source on the wide side surface, and forming a light reflective coating layer on the narrow side surface, the first side surface and the second side surface.

According to another aspect of the present disclosure, the present disclosure provides a manufacturing method of the liquid crystal display device. The manufacturing method comprises steps: forming a light guide plate for backlight and comprising a front face, a rear surface and the four side surfaces, and wherein the four side surfaces are located between the front face and the rear surface, the four side surfaces comprises a wide side surface, a narrow side surface, a first side surface and a second side surface, and the first side surface and the second side surface are located between the wide side surface and the narrow side surface, and the front face comprises a plane, a first inclined surface and a second inclined surface, and the first inclined surface is located at a corner of the light guide plate and adjacent to the narrow side surface and the first side surface, and the second inclined surface is located at other corner of the light guide plate and adjacent to the narrow side surface and the second side surface; providing a backlight source disposed on the plane, the first inclined surface and the second inclined surface; providing a circuit board disposed on the backlight source located on the first inclined surface.

Preferably, the manufacturing method comprises step of: providing a LCD panel disposed on the rear surface of the light guide plate.

Preferably, the manufacturing method comprises step of: providing a tape and reel chip carrier electrically connect to the LCD panel and the circuit board.

Preferably, the manufacturing method comprises step of: providing an integrated circuit disposed on a tape and reel chip carrier and configured to drive the LCD panel.

Preferably, the backlight source comprises a plurality of the backlight bars.

Preferably, the manufacturing method comprises step of: forming a light reflective coating layer on the four side surfaces.

Preferably, the manufacturing method comprises step of: disposing a variable-frequency circuit board or other circuit board on the second inclined surface of the light guide plate.

Preferably, the backlight source is a dot matrix LED.

According to aforementioned content, the present disclosure provides a technical solution of setting configuration locations of various circuit boards to decrease the thickness of the liquid crystal display device; furthermore, the light guide plate has the inclined surface only located near the edge or the corner thereof, as a result, the light guide plate is able to maintain uniformity of light source.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
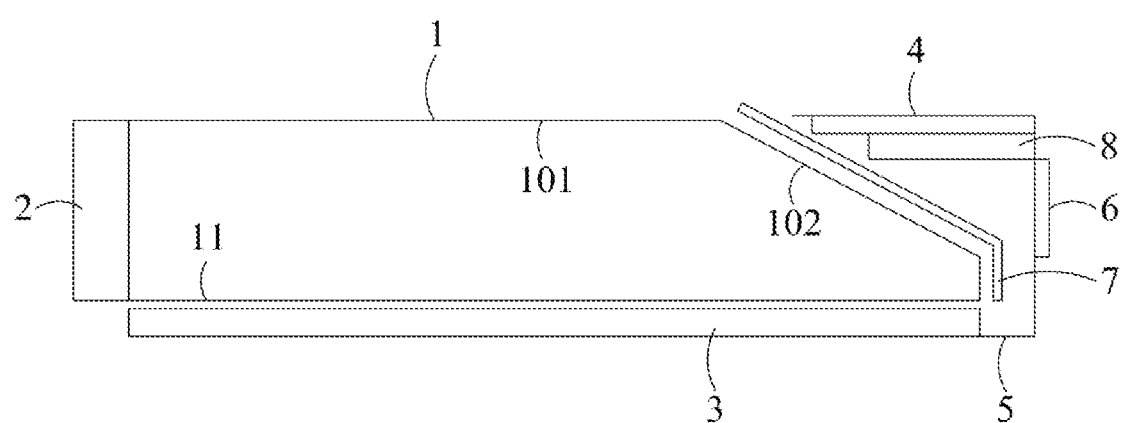
FIG. 1 is a schematic view of a liquid crystal display device of an embodiment of the present disclosure.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

Figure 2:
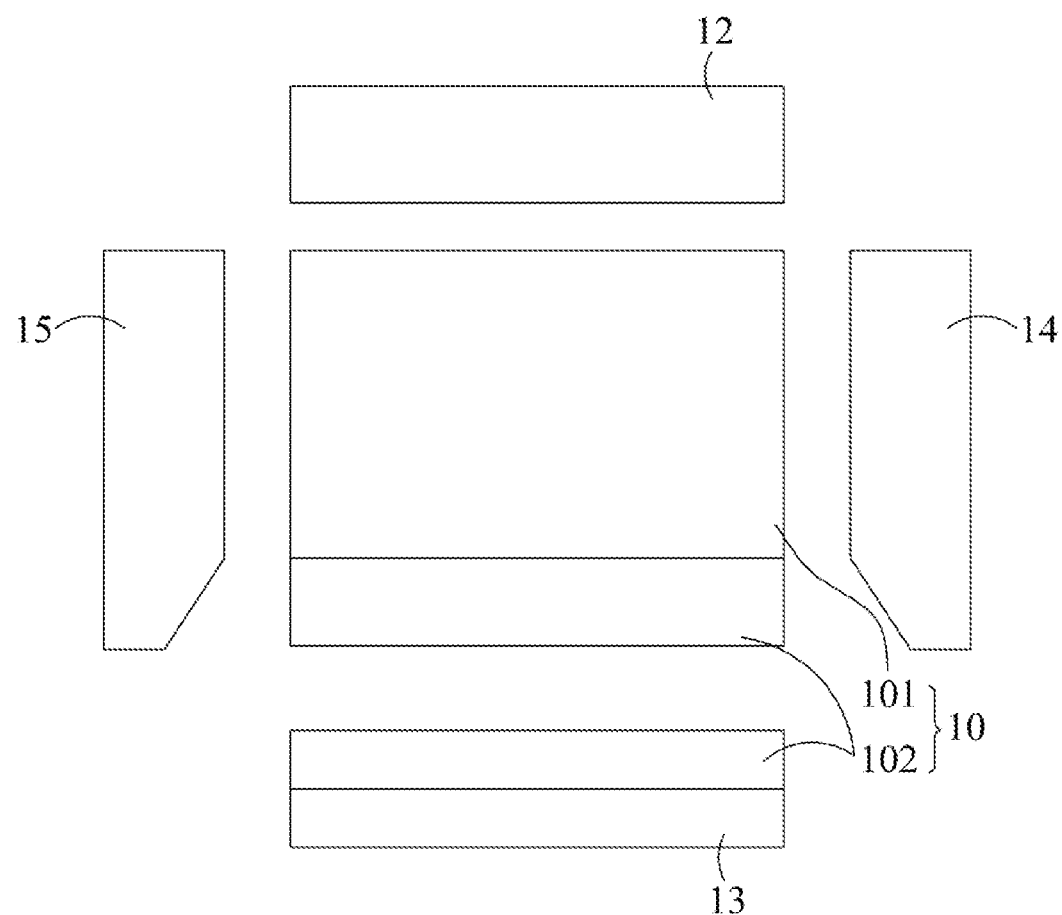
FIG. 2 is an exploded view of a light guide plate of a liquid crystal display device of an embodiment of the present disclosure.

Please refer to FIGS. 1 and 2. FIG. 1 is a schematic view of a liquid crystal display device of an embodiment of the present disclosure, and FIG. 2 is an exploded view of a light guide plate of a liquid crystal display device of an embodiment of the present disclosure. A liquid crystal display device includes a light guide plate 1, a backlight source 2, an LCD panel 3, a circuit board 4 and a tape and reel chip carrier 5. The light guide plate 1 is used for backlight. The light guide plate 1 comprises a front face 10, a rear surface 11 and four side surfaces 12, 13, 14 and 15. The four side surfaces 12, 13, 14 and 15 are located between the front face 10 and the rear surface 11, and the four side surfaces 12, 13, 14 and 15 include a wide side surface 12, a narrow side surface 13, a first side surface 14 and a second side surface 15. The first side surface 14 and the second side surface 15 are located between the wide side surface 12 and the narrow side surface 13. The front face 10 includes a plane 101 and an inclined surface 102, and the inclined surface 102 is located at an edge of the light guide plate 1 and adjacent to the narrow side surface 13. As a result, as shown in FIG. 2, each of the first side surface 14 and the second side surface 15 is in a pentagon shape formed by a trapezoid shape and a rectangular shape. Furthermore, the backlight source 2 is disposed on at least one of the four side surface 12; as shown in FIG. 2, the backlight source 2 of FIG. 2 is disposed on the wide side surface 12, and the liquid crystal display device of this embodiment is an edge-lit liquid crystal display device. The LCD panel 3 is disposed on the rear surface 11 of the light guide plate 1. The circuit board 4 is disposed on the inclined surface 102 of the light guide plate 1. The tape and reel chip carrier 5 is electrically connected to the LCD panel 3 and the circuit board 4. An integrated circuit 6 is disposed on the tape and reel chip carrier 5, and configured to drive the LCD panel 3.

In this embodiment, the backlight source 2 is disposed on the wide side surface 12, the light reflective coating layer 7 can cover on the narrow side surface 13, the first side surface 14, the second side surface 15 and the edges of the light guide plate 1, there by receiving or reflecting the light emitted, by the backlight source 2, from the wide side surface 12, and preventing the integrated circuit 6 from being affected by light, which is emitted by the backlight source 2 and passing through the light guide plate 1, from other edge. As a result, the integrated circuit 6 can be prevented from executing wrong liquid crystal display.

In another embodiment, the backlight source 2 can be disposed on the wide side surface 12 and the first side surface 14, for example, an L-shaped backlight bar or two straight backlight bar can be disposed on the wide side surface 12 and the first side surface 14, and when the backlight source 2 is disposed on more side surfaces, more uniform light source can be provided, but the present disclosure is not limited thereto. The light reflective coating layer 7 is opposite to the wide side surface 12 and the first side surface 14, and can cover the narrow side surface 13, the second side surface 15 and the edges of the light guide plate 1, thereby receiving or reflecting light, emitted by the backlight source 2, from the wide side surface 12 and the first side surface 14, and prevent the integrated circuit 6 from being affected by light, which is emitted by the backlight source 2 and passing through the light guide plate 1, from other edge. As a result, the integrated circuit 6 can be prevented from executing wrong liquid crystal display.

Furthermore, as shown in FIG. 1, the variable-frequency circuit board 8 or other circuit board can be disposed on the inclined surface 102 of the light guide plate 1 and adjacent to the circuit board 4. By disposing the circuit board 4, the variable-frequency circuit board 8 or other circuit board on the inclined surface 102 of the light guide plate 1, the liquid crystal display device can become thinner; furthermore, the light guide plate 1 has the inclined surface 102 only located near the edge thereof, so the light guide plate 1 is able to maintain uniformity of light source.

Figure 4:
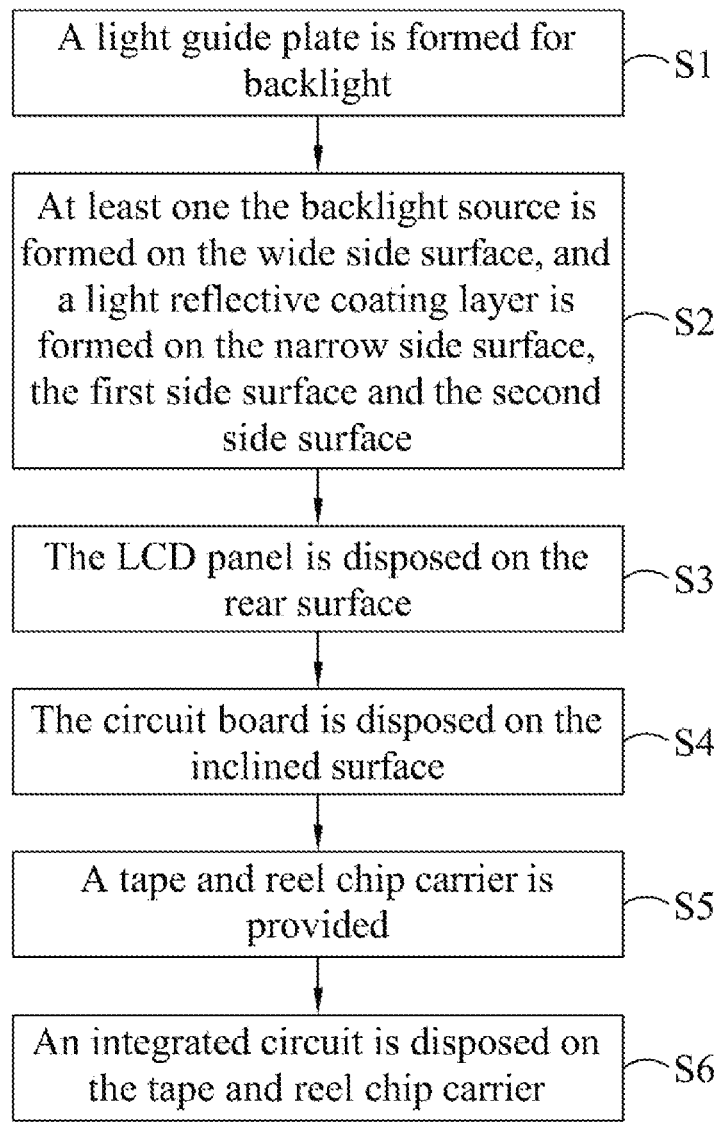
FIG. 4 is a flowchart showing the steps in an operation of a manufacturing method of a liquid crystal display device of an embodiment of the present disclosure.

Please refer to FIGS. 1, 2 and 4. FIG. 4 is a flowchart showing the steps in an operation of a manufacturing method of a liquid crystal display device of an embodiment of the present disclosure The manufacturing method includes steps S1~S6. In the step S1, a light guide plate 1 is formed for backlight. In the step S2, at least one the backlight source 2 is formed (or disposed) on the wide side surface 12, and a light reflective coating layer 7 is formed on the narrow side surface 13, the first side surface 14 and the second side surface 15; in the other embodiment, when the backlight source 2 is disposed on the wide side surface 12 and the first side surface 14, the light reflective coating layer 7 can be formed on the narrow side surface 13 and the second side surface 15 of the light guide plate 1. In the step S3, the LCD panel 3 is disposed on the rear surface 11. In the step S4, the circuit board 4 is disposed on (or over, or above) the inclined surface 102; in other embodiment, the variable-frequency circuit board 8 or other circuit board can be disposed on (or over) the inclined surface 102. Next, in the step S5, a tape and reel chip carrier 5 is provided. Step S6, an integrated circuit 6 is disposed on the tape and reel chip carrier 5.

Figure 3:
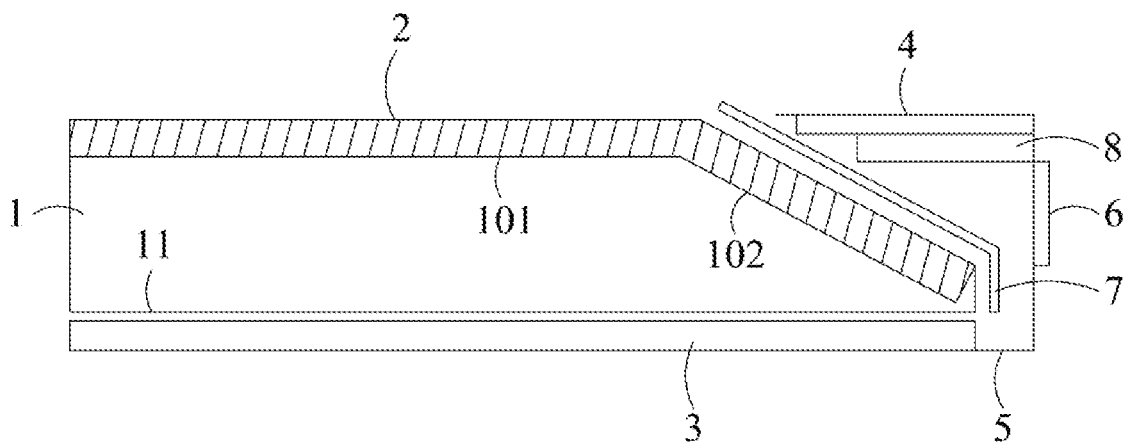
FIG. 3 is a schematic view of a liquid crystal display device of another embodiment of the present disclosure.

FIG. 3 is a schematic view of a liquid crystal display device of another embodiment of the present disclosure. Please refer to FIGS. 3 and 2. The liquid crystal display device includes the light guide plate 1, the backlight source 2, the LCD panel 3, the circuit board 4 and the tape and reel chip carrier 5. The light guide plate 1 is used for backlight, and comprises the front face 10, the rear surface 11 and the four side surfaces 12, 13, 14 and 15. The four side surfaces 12, 13, 14 and 15 are located between the front face 10 and the rear surface 11, the four side surfaces 12, 13, 14 and 15 include the wide side surface 12, the narrow side surface 13, the first side surface 14 and the second side surface 15. The first side surface 14 and the second side surface 15 are located between the wide side surface 12 and the narrow side surface 13. The front face 10 includes the plane 101 and the inclined surface 102, and the inclined surface 102 is located at an edge of the light guide plate 1 and adjacent to the narrow side surface 13; as shown in FIG. 2, each of the first side surface 14 and the second side surface 15 is in a pentagon shape formed by a trapezoid shape and a rectangular shape. Furthermore, the backlight source 2 is disposed on the plane 101 and the inclined surface 102, and the liquid crystal display device of this embodiment is a direct type liquid crystal display device. The LCD panel 3 is disposed on the rear surface 11 of the light guide plate 1. The circuit board 4 is disposed on (or over) the backlight source 2 located on the inclined surface 102. The tape and reel chip carrier 5 is electrically connected to the LCD panel 3 and the circuit board 4. The integrated circuit 6 disposed on the tape and reel chip carrier 5 and configured to drive the LCD panel 3.

In particular embodiment, the backlight source 2 may include a plurality of backlight bars or dot matrix LEDs, to form a surface light source. The backlight source 2 is, disposed on the plane 101 and the inclined surface 102, so the light reflective coating layer 7 can cover the four side surfaces 12, 13, 14 and 15, and the edges of the light guide plate 1, thereby receiving or reflecting light, emitted by the backlight source 2, from the plane 101 and the inclined surface 102, and preventing the integrated circuit 6 from being affected by light, which is emitted by the backlight source 2 and passing through the light guide plate 1, from other edge. As a result, the integrated circuit 6 can be prevented from executing wrong liquid crystal display.

Furthermore, as shown in FIG. 3, the variable-frequency circuit board 8 or other circuit board can be disposed on the inclined surface 102 of the light guide plate 1 and adjacent to the circuit board 4. By disposing the circuit board 4, the variable-frequency circuit board 8 or other circuit board on (or over) the inclined surface 102 of the light guide plate 1, the liquid crystal display device can become thinner; furthermore, the light guide plate 1 has the inclined surface 102 only located near the edge thereof, so the light guide plate 1 is still able to maintain uniformity of light source.

Figure 5:
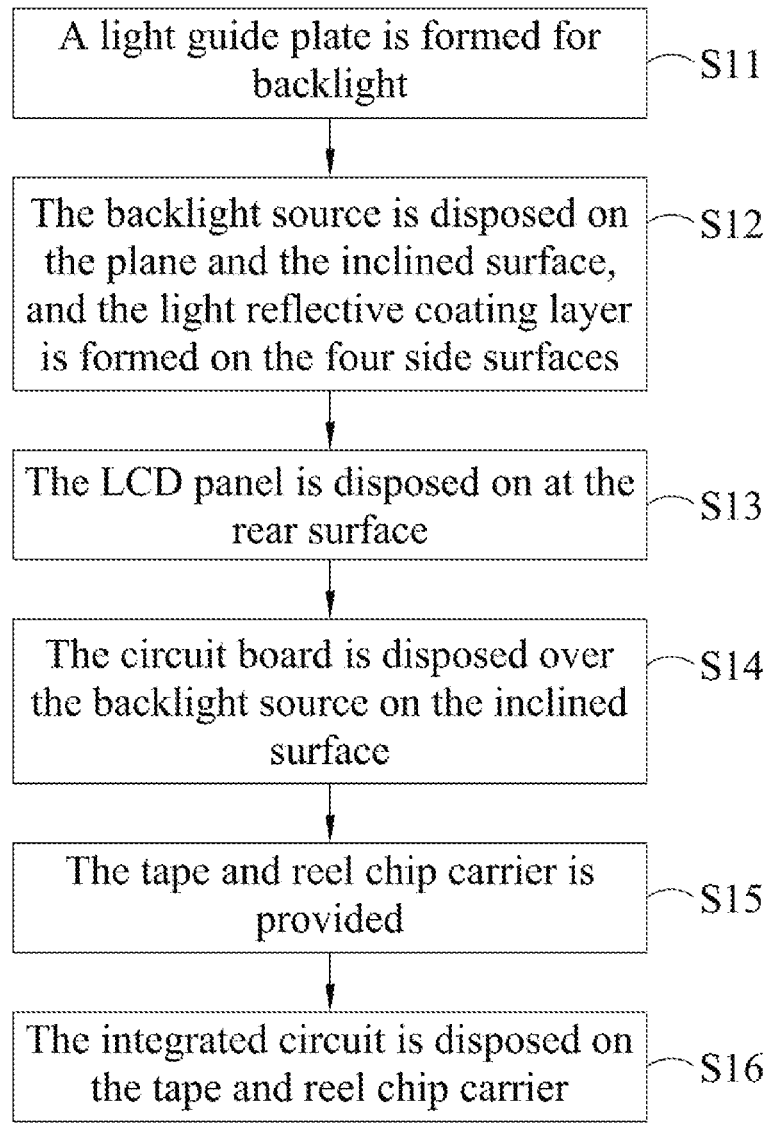
FIG. 5 is a flowchart showing the steps in an operation of a manufacturing method of a liquid crystal display device of another embodiment of the present disclosure.

Please refer to FIGS. 2, 3 and 5. FIG. 5 is a flowchart showing the steps in an operation of a manufacturing method of a liquid crystal display device of another embodiment of the present disclosure. The manufacturing method includes steps S11~S16. In the step S11, a light guide plate 1 is formed for backlight. In the step S12, the backlight source 2 is disposed on the plane 101 and the inclined surface 102, and the light reflective coating layer 7 is formed on the four side surfaces 12, 13, 14 and 15. In the step S13, the LCD panel 3 is disposed on at the rear surface 11. In the step S14, the circuit board 4 is disposed over the backlight source 2 on the inclined surface 102; in other embodiment, the variable-frequency circuit board 8 or other circuit board can be disposes over the backlight source 2 on the inclined surface 102. Next, in the step S15, the tape and reel chip carrier 5 is provided. In the step S16, the integrated circuit 6 is disposed on the tape and reel chip carrier 5.

Figure 6:
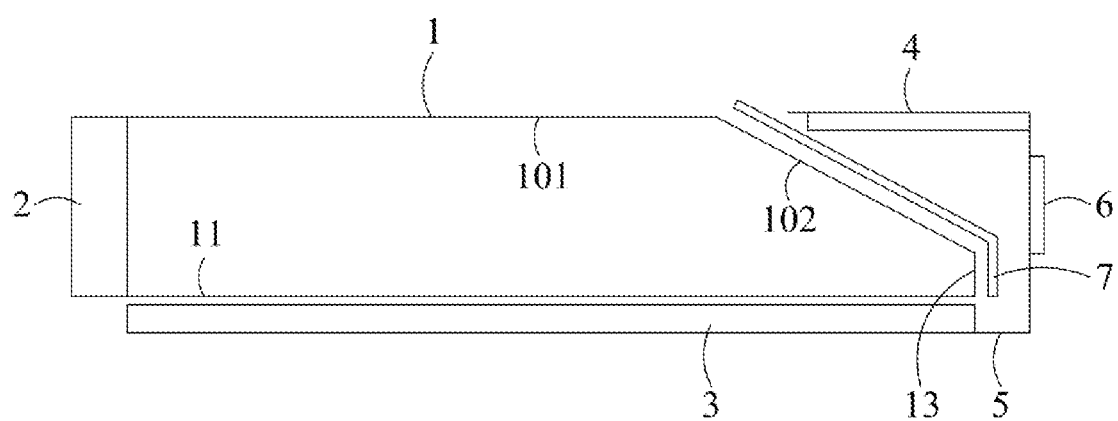
FIG. 6 is a schematic view of a liquid crystal display device of an embodiment of the present disclosure.
Figure 7:
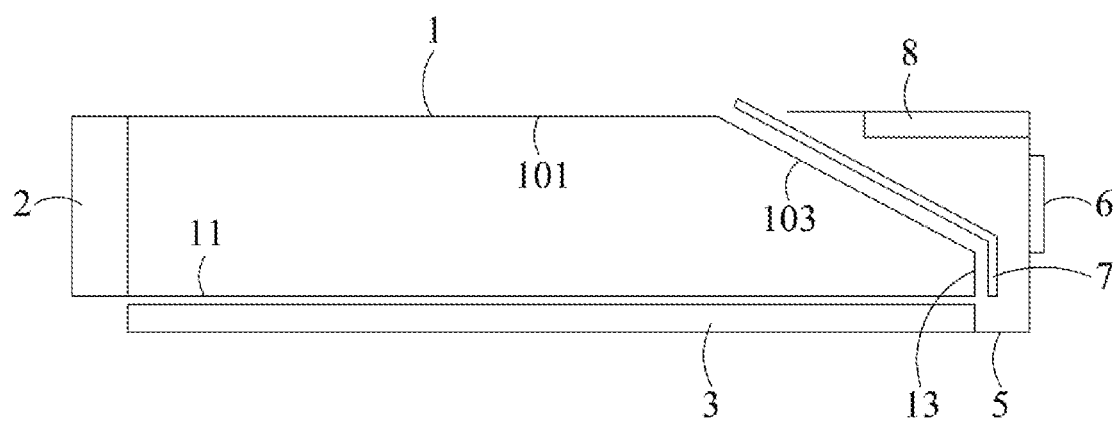
FIG. 7 is a schematic view of a liquid crystal display device of an embodiment of the present disclosure.
Figure 8:
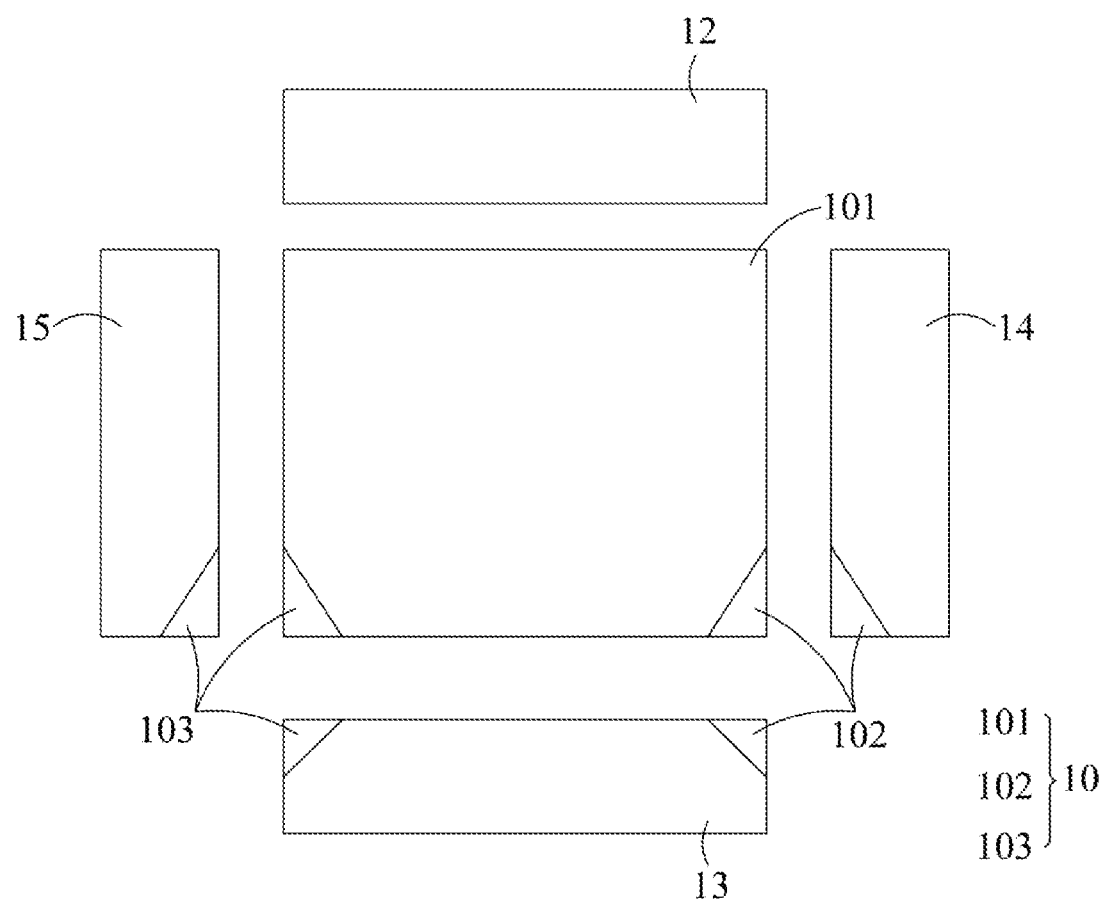
FIG. 8 is an exploded view of a light guide plate of a liquid crystal display device of an embodiment of the present disclosure.

Please refer FIGS. 6, 7 and 8. FIG. 6 is a schematic view of a liquid crystal display device of an embodiment of the present disclosure, FIG. 7 is a schematic view of a liquid crystal display device of an embodiment of the present disclosure, and FIG. 8 is an exploded view of a light guide plate of a liquid crystal display device of an embodiment of the present disclosure. The liquid crystal display device includes the light guide plate 1, the backlight source 2, the LCD panel 3, the circuit board 4 and the tape and reel chip carrier 5. The light guide plate 1 is used for backlight, and comprises the front face 10, the rear surface 11 and the four side surfaces 12, 13, 14, and 15. The four side surfaces 12, 13, 14, and 15 are located between the front face 10 and the rear surface 11, and the four side surfaces 12, 13, 14 and 15 include the wide side surface 12, the narrow side surface 13, the first side surface 14 and the second side surface 15. The first side surface 14 and the second side surface 15 are located between the wide side surface 12 and the narrow side surface 13. The front face 10 includes the plane 101, the first inclined surface 102 and the second inclined surface 103, the first inclined surface 102 is located at the corner of the light guide plate 1 and adjacent to the narrow side surface 13 and the first side surface 14, and the second inclined surface 103 is located at the corner of the light guide plate 1 and adjacent to the narrow side surface 13 and the second side surface 15. As shown in FIG. 8, each of the first side surface 14 and the second side surface 15 is in a pentagon shape formed by a trapezoid shape and a rectangular shape, the narrow side surface 13 is in a hexagon shape. Furthermore, the at least one backlight source 2 is disposed on at least one of the side surfaces 12, 13, 14 and 15. As shown in FIGS. 6 and 7, the backlight source 2 of this embodiment is disposed on at least one the wide side surface 12, and the liquid crystal display device of this embodiment is an edge-lit the liquid crystal display device. The LCD panel 3 is disposed on the rear surface 11 of the light guide plate 1. The circuit board 4 is dispose on the first inclined surface 102 of the light guide plate 1. The tape and reel chip carrier 5 is electrically connected to the LCD panel 3 and the circuit board 4. The integrated circuit 6 is disposed on the tape and reel chip carrier 5, and configured to drive the LCD panel 3.

In this embodiment, the backlight source 2 is disposed on the wide side surface 12, the light reflective coating layer 7 can cover on the narrow side surface 13, the first side surface 14, the second side surface 15 and the edges of the light guide plate 1, thereby receiving or reflecting the light emitted, by the backlight source 2, from the wide side surface 12, and preventing the integrated circuit 6 from being affected by light, which is emitted by the backlight source 2 and passing through the light guide plate 1, from other edge. As a result, the integrated circuit 6 can be prevented from executing wrong liquid crystal display.

In another embodiment, the backlight source 2 can be disposed on the wide side surface 12 and the first side surface 14, for example, L-shaped the backlight bar or two straight the backlight bars can be disposed on the wide side surface 12 and the first side surface 14. When the backlight source 2 is disposed on more side surfaces, more uniform light source can be provided, but the present disclosure is not limited thereto. The light reflective coating layer 7 is opposite to the wide side surface 12 and the first side surface 14, and can cover on the narrow side surface 13, the second side surface 15, and the edges of the light guide plate 1, thereby receiving or reflecting light, emitted by the backlight source 2, from the wide side surface 12 and the first side surface 14, and preventing the integrated circuit 6 from being affected by light, which is emitted by the backlight source 2 and passing through the light guide plate 1, from other edge. As a result, the integrated circuit 6 can be prevented from executing wrong liquid crystal display.

Furthermore, as shown in FIG. 7, the variable-frequency circuit board 8 or other circuit board can also be disposed on the second inclined surface 103 of the light guide plate 1. According to disposal of the circuit board 4, the variable-frequency circuit board 8 or other circuit board on (or over) the first inclined surface 102 and the second inclined surface 103 of the light guide plate 1, the liquid crystal display device can become thinner; furthermore, the light guide plate 1 includes the first inclined surface 102 and the second inclined surface 103 only formed at the corners, so the light guide plate 1 is still able to maintain uniformity of light source.

Figure 11:
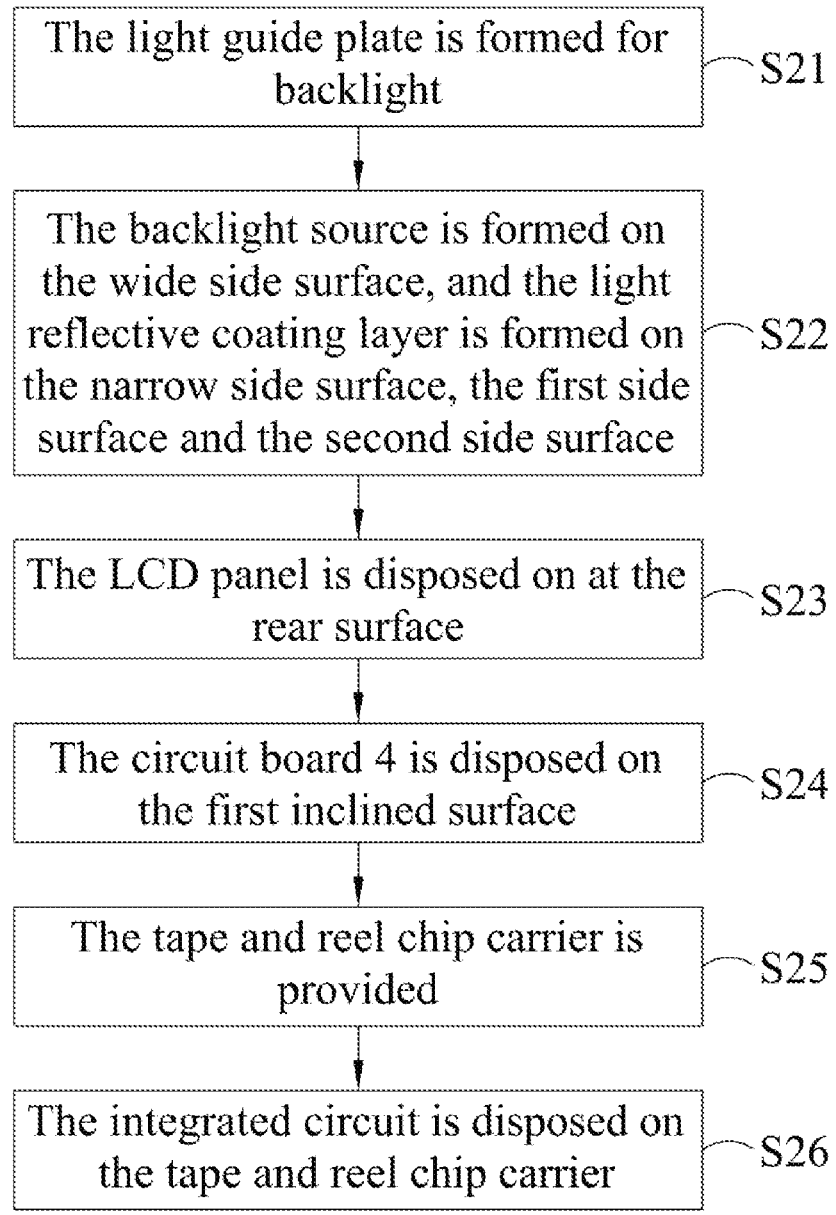
FIG. 11 is a flowchart showing the steps in an operation of a manufacturing method of a liquid crystal display device of the present disclosure.

Furthermore, FIG. 11 is a flowchart showing the steps in an operation of a manufacturing method of a liquid crystal display device of an embodiment of the present disclosure. Please refer to FIGS. 6, 7, 8 and 11. The manufacturing method includes steps S21~S26. In the step S21, the light guide plate 1 is formed for backlight. In the step S22, the backlight source 2 is formed (or disposed) on the wide side surface 12, and the light reflective coating layer 7 is formed on the narrow side surface 13, the first side surface 14 and the second side surface 15; however, when the backlight source 2 is disposed on the wide side surface 12 and the first side surface 14, the light reflective coating layer 7 can be formed on the narrow side surface 13 and the second side surface 15 of the light guide plate 1. In the step S23, the LCD panel 3 is disposed on the rear surface 11. In the step S24, the circuit board 4 is disposed on the first inclined surface 102; furthermore, the variable-frequency circuit board 8 or other circuit board can also be disposed on the second inclined surface 103. Next, in the step S25, the tape and reel chip carrier 5 is provided. In the step S26, the integrated circuit 6 is disposed on the tape and reel chip carrier 5.

Figure 9:
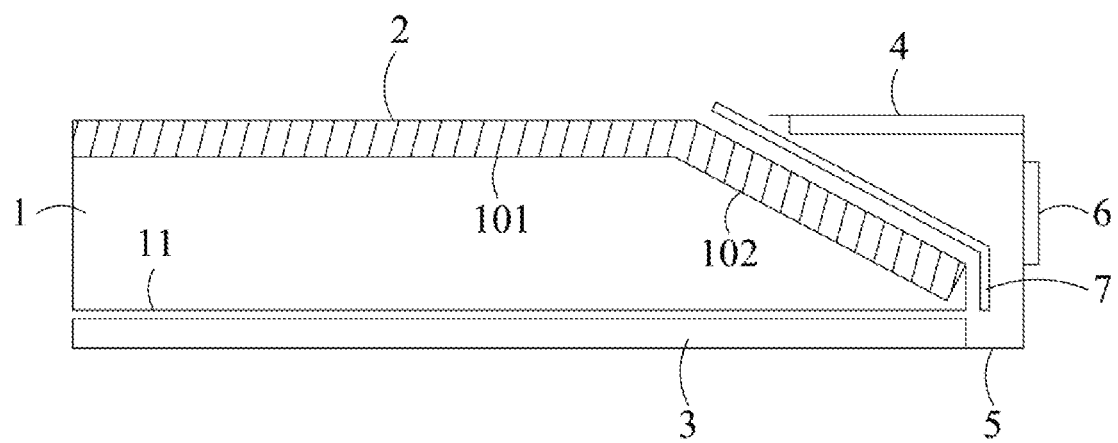
FIG. 9 is a schematic view of a liquid crystal display device of another embodiment of the present disclosure.
Figure 10:
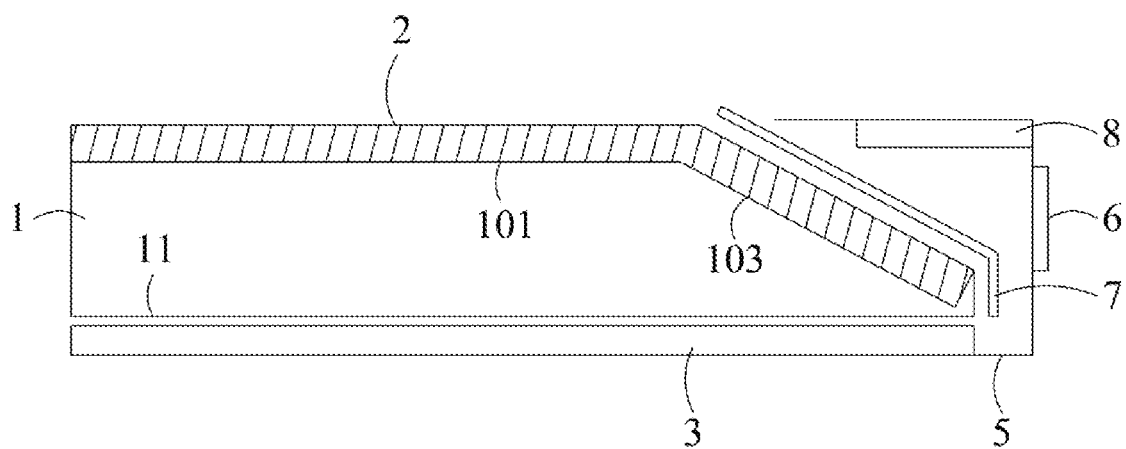
FIG. 10 is a schematic view of a liquid crystal display device of another embodiment of the present disclosure.

FIG. 9 is a schematic view of a liquid crystal display device of another embodiment of the present disclosure, and FIG. 10 is a schematic view of a liquid crystal display device of another embodiment of the present disclosure. Please refer to FIGS. 8, 9 and 10. A liquid crystal display device includes the light guide plate 1, the backlight source 2, the LCD panel 3, the circuit board 4 and the tape and reel chip carrier 5. The light guide plate 1 is used for backlight and comprises the front face 10, the rear surface 11 and the four side surfaces 12, 13, 14 and 15. The four side surfaces 12, 13, 14 and 15 are located between the front face 10 and the rear surface 11, the four side surfaces 12, 13, 14 and 15 include the wide side surface 12, the narrow side surface 13, the first side surface 14 and the second side surface 15. The first side surface 14 and the second side surface 15 are located between the wide side surface 12 and the narrow side surface 13. The front face 10 includes the plane 101, the first the inclined surface 102 and the second inclined surface 103, and the first the inclined surface 102 is located at the corner of the light guide plate 1 and adjacent to the narrow side surface 13 and the first side surface 14. The second inclined surface 103 is located at the corner of the light guide plate 1 and adjacent to the narrow side surface 13 and the second side surface 15. As shown in FIG. 8, each of the first side surface 14 and the second side surface 15 is in a pentagon shape formed by a trapezoid shape and a rectangular shape, the narrow side surface 13 is in a hexagon shape. Furthermore, the backlight source 2 is disposed on the plane 101, the first inclined surface 102 and the second inclined surface 103, and the liquid crystal display device of this embodiment is a direct type the liquid crystal display device. The LCD panel 3 is disposed on the rear surface 11 of the light guide plate 1. The circuit board 4 is disposed on (or over) the backlight source 2 located on the first inclined surface 102. The tape and reel chip carrier 5 is electrically connected to the LCD panel 3 and the circuit board 4. The integrated circuit 6 is disposed on the tape and reel chip carrier 5, and configured to drive the LCD panel 3.

In particular embodiment, the backlight source 2 may include a plurality of backlight bars or dot matrix LEDs, to form the surface light source. The backlight source 2 is disposed on the plane 101, the first the inclined surface 102 and the second inclined surface 103, the light reflective coating layer 7 can cover the four side surfaces 12, 13, 14 and 15, and the edges of the light guide plate 1, thereby receiving or reflecting the light, emitted by the backlight source 2, from the plane 101, the first inclined surface 102 and the second inclined surface 103, and preventing the integrated circuit 6 from being affected by light, which is emitted by the backlight source 2 and passing through the light guide plate 1, from other edge. As a result, the integrated circuit 6 can be prevented from executing wrong liquid crystal display.

Furthermore, as shown in FIG. 10, the variable-frequency circuit board 8 or other circuit board can be disposed on (or over) the backlight source 2 located on the second inclined surface 103. According to disposal of the circuit board 4, the variable-frequency circuit board 8 or other circuit board over the backlight source 2 located on the first inclined surface 102 and the second inclined surface 103 of the light guide plate 1, the liquid crystal display device can become thinner; furthermore, the light guide plate 1 includes the first the inclined surface 102 and the second inclined surface 103 formed at the corners only, so the light guide plate 1 is still able to maintain uniformity of light source.

Figure 12:
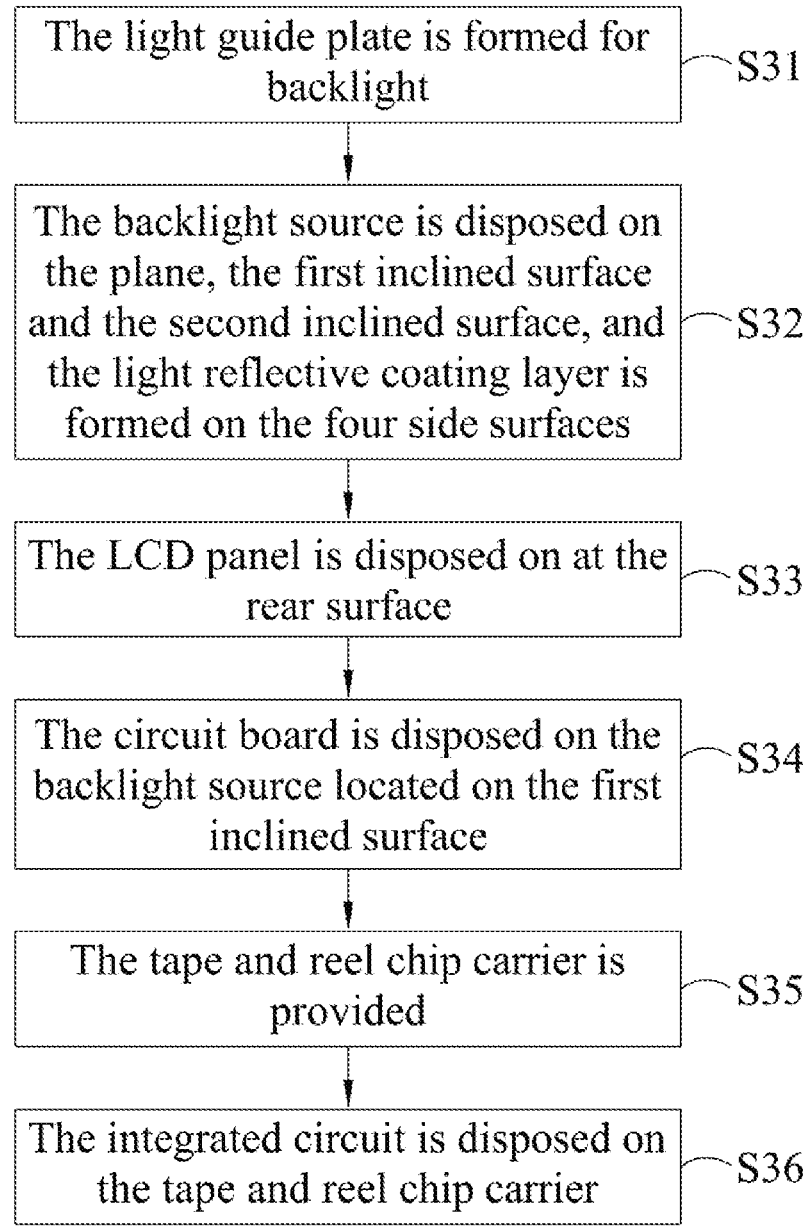
FIG. 12 is a flowchart showing the steps in an operation of a manufacturing method of a liquid crystal display device of another embodiment of the present disclosure.

Furthermore, FIG. 12 is a flowchart showing the steps in an operation of a manufacturing method of a liquid crystal display device of another embodiment of the present disclosure. Please refer to FIGS. 8, 9, 10 and 12. The manufacturing method includes step S31~36. In the step S31, a light guide plate 1 is formed for backlight. In the step S32, the backlight source 2 is disposed on the plane 101, the first inclined surface 102 and the second inclined surface 103, and the light reflective coating layer 7 is formed on the four side surfaces 12, 13, 14 and 15. In the step S33, the LCD panel 3 is disposed on the rear surface 11. In the step S34, the circuit board 4 is disposed on (or over, or above) the backlight source 2 located on the first inclined surface 102; in other embodiment, the variable-frequency circuit board 8 or other circuit board can be disposes on (or over, or above) the backlight source 2 located on the second inclined surface 103. Next, in the step S35, the tape and reel chip carrier 5 is provided. In the step S36, an integrated circuit 6 is disposed on the tape and reel chip carrier 5.

The present disclosure provides the light guide plate structure to make entire liquid crystal display device thinner and maintain uniformity of the light source.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A liquid crystal display device, comprising:
a light guide plate used for providing backlight, comprising a front face, a rear surface and four side surfaces, wherein the four side surfaces are located between the front face and the rear surface, the four side surfaces comprise a wide side surface, a narrow side surface, a first side surface and a second side surface, the first side surface and the second side surface are located between the wide side surface and the narrow side surface, wherein the front face comprises a plane and an inclined surface, the inclined surface is located at an edge of the light guide plate and adjacent to the narrow side surface;
a backlight source disposed directly on the plane and the inclined surface;
a circuit board disposed above and overlapped with the backlight source in a direction perpendicular to the inclined surface; and
a light reflective coating layer disposed between the circuit board and the light guide plate, the light reflective coating layer extending over the narrow side surface and the inclined surface of the light guide plate.

2. A liquid crystal display device, comprising:
a light guide plate used for providing backlight, comprising a front face, a rear surface and four side surfaces, wherein the four side surfaces are located between the front face and the rear surface, the four side surfaces comprises a wide side surface, a narrow side surface, a first side surface and a second side surface, the first side surface and the second side surface are located between the wide side surface and the narrow side surface, wherein the front face comprises a plane, a first inclined surface and a second inclined surface, the first inclined surface is located at a corner of the light guide plate and adjacent to the narrow side surface and the first side surface, and the second inclined surface is located at other corner of the light guide plate and adjacent to the narrow side surface and the second side surface;
a backlight source disposed directly on the plane, the first inclined surface and the second inclined surface;
a circuit board disposed above and overlapped with the backlight source in a direction perpendicular to the first inclined surface; and
a light reflective coating layer disposed between the circuit board and the light guide plate, the light reflective coating layer extending over the narrow side surface, the first inclined surface and the second inclined surface of the light guide plate.

3. The liquid crystal display device according to claim 2, wherein the backlight source comprises a plurality of backlight bars.

4. A manufacturing method of a liquid crystal display device, comprising:
forming a light guide plate used for providing backlight, wherein the light guide plate comprises a front face, a rear surface and the four side surfaces, and four side surfaces are located between the front face and the rear surface, the four side surfaces comprises a wide side surface, a narrow side surface, a first side surface and a second side surface, the first side surface and the second side surface are located between the wide side surface and the narrow side surface, and the front face comprises a plane and an inclined surface, and the inclined surface is located at an edge of the light guide plate and adjacent to the narrow side surface;
forming at least one backlight source directly on the plane and the inclined surface;
providing a circuit board disposed above and overlapped with the at least one backlight source in a direction perpendicular to the inclined surface of the light guide plate; and
forming a light reflective coating layer between the circuit board and the light guide plate, the light reflective coating layer extending over the narrow side surface and the inclined surface of the light guide plate.

5. The manufacturing method according to claim 4, wherein the backlight source comprises a plurality of backlight bars.

6. A manufacturing method of a liquid crystal display device, comprising:
forming a light guide plate used for providing backlight, wherein the light guide plate comprises a front face, a rear surface and the four side surfaces, and four side surfaces are located between the front face and the rear surface, the four side surfaces comprises a wide side surface, a narrow side surface, a first side surface and a second side surface, the first side surface and the second side surface are located between the wide side surface and the narrow side surface, and the front face comprises a plane, a first inclined surface and a second inclined surface, and the first inclined surface is located at a corner of the light guide plate and adjacent to the narrow side surface and the first side surface, and the second inclined surface is located at other corner of the light guide plate and adjacent to the narrow side surface and the second side surface;
forming a backlight source directly on the plane, the first inclined surface, and the second inclined surface;
providing a circuit board disposed above and overlapped with the backlight source in a direction perpendicular to the first inclined surface of the light guide plate; and
forming a light reflective coating layer between the circuit board and the light guide plate, the light reflective coating layer extending over the narrow side surface, the first inclined surface and the second inclined surface of the light guide plate.

7. The manufacturing method according to claim 6, wherein the backlight source comprises a plurality of backlight bars.

* * * * *